United States Patent [19]

Adolfs et al.

[11] Patent Number: 4,921,352
[45] Date of Patent: May 1, 1990

[54] CONTACTLESS OPTICAL PROCESS FOR IDENTIFYING OBJECTS

[75] Inventors: Friedhelm Adolfs, Ratingen; Gerd Bittner, Bottrop; Klaus P. Büsing, Datteln; Stephen Harris, Ratingen; Ulrich Hahn; Martin Würzburger, both of Essen, all of Fed. Rep. of Germany

[73] Assignee: Fried. Krupp Gesellschaft mit beschränkter Haftung, Essen, Fed. Rep. of Germany

[21] Appl. No.: 123,247

[22] Filed: Nov. 20, 1987

[30] Foreign Application Priority Data

Nov. 20, 1986 [DE] Fed. Rep. of Germany ....... 3639587
Feb. 12, 1987 [DE] Fed. Rep. of Germany ....... 3704313

[51] Int. Cl.⁵ ................................................ G01N 9/02
[52] U.S. Cl. ...................................... 356/347; 356/363
[58] Field of Search ........................ 356/342, 348, 363

[56] References Cited

U.S. PATENT DOCUMENTS

| | | |
|---|---|---|
| 3,647,275 | 3/1972 | Ward . |
| 3,961,198 | 6/1976 | Aungst . |
| 4,082,431 | 4/1978 | Ward, III . |
| 4,113,388 | 9/1978 | Gates et al. ............... 356/363 X |
| 4,152,723 | 5/1979 | McMahon et al. . |
| 4,227,807 | 10/1980 | Pond et al. ............... 356/363 X |
| 4,333,006 | 6/1982 | Gorin et al. . |
| 4,368,979 | 1/1983 | Ruell .............................. 356/71 |
| 4,405,238 | 9/1983 | Grobman et al. . |
| 4,423,959 | 1/1984 | Nakazawa et al. . |
| 4,466,693 | 8/1984 | Matsuda et al. . |
| 4,631,223 | 12/1986 | Sander ...................... 283/904 X |

FOREIGN PATENT DOCUMENTS

| | | |
|---|---|---|
| 0042946 | 1/1982 | European Pat. Off. . |
| 1673846 | 2/1970 | Fed. Rep. of Germany . |
| 2228502 | 12/1973 | Fed. Rep. of Germany . |
| 2503038 | 8/1975 | Fed. Rep. of Germany . |
| 2516236 | 10/1976 | Fed. Rep. of Germany . |
| 2838243 | 1/1980 | Fed. Rep. of Germany . |
| 0066608 | 1/1982 | Fed. Rep. of Germany . |
| 3427067 | 2/1985 | Fed. Rep. of Germany . |
| 3422910 | 9/1985 | Fed. Rep. of Germany . |
| 3427108 | 1/1986 | Fed. Rep. of Germany . |
| 3538812 | 5/1986 | Fed. Rep. of Germany . |
| 8504266 | 10/1985 | PCT Int'l Appl. . |

OTHER PUBLICATIONS

Goodman, "Introduction to Fourier Optics," pp. 159-184.
G. Bickel et al., "Three-Dimensional Inspection of Large Objects," ICO-13 Conference Digest, of the 13th Congress of the International Commission for Optics (1984), pp. 534-535.
P. Hariharan, "Optical Holography" (1984), pp. 12-23, 118-121, and 187-192.
Siegfried B. Rentzsch, "Begriffe der Elektronik", Mikrocomputer von A-Z, Franzis Elektronik-Nachschlagewerk (1985), pp. 72-73.
J. B. Ramsden, "Topographical Identification", IBM Technical Disclosure Bulletin, vol. 23, No. 10, (Mar., 1981), pp. 4442-4443.

*Primary Examiner*—Davis L. Willis
*Assistant Examiner*—Matthew W. Koren
*Attorney, Agent, or Firm*—Spencer & Frank

[57] ABSTRACT

A contactless optical process with which characteristics such as the type, position, deformation, and vibration spectrum, of an object can determined and/or measured. In this process, coherent light is changed by an optical medium fixed to the object. Suitable optical media, such as acousto-optical transducers or special holograms, are selected for the respective characteristics. A photosensitive receiver equipped with evaluation means determines the respective characteristics of the object from the changes in the coherent light caused by these optical media.

28 Claims, 6 Drawing Sheets

CONTACTLESS OPTICAL PROCESS FOR IDENTIFYING OBJECTS

BACKGROUND OF THE INVENTION

The present invention relates to an optical process with which the type, position, deformation, and vibrations of objects can be determined.

In the past, different techniques were required for determining characteristics of an object such as the type, position, deformation, and vibrations. In the present application, determining the "type" of object means to identify the object, or to classify the object by type.

The optical identification of objects, for example by means of bar codes, is useful only within limits due to their size, low information density (10 characters/cm), sensitivity to soiling, damage and vibrations.

The optical position detection process including image processing systems is very expensive, requires complicated and individualized software for each object and, due to the performance of image analysis, is too slow for some automatic applications. Moreover, this process can be used only for simple geometric structures and is sensitive to surface reflections.

Contactless optical determination of deformation, for example according to the Moire method or by means of holographic interferometry, is expensive and not very adaptable with respect to sensitivity, is sensitive to vibrations, and is sensitive to damage and obstruction of sensor.

The contactless determination of vibrations of objects according to prior art methods is very expensive and too slow for some automatic applications.

SUMMARY OF THE INVENTION

It is therefore an object of the present invention to perform the identification of objects in a process which is faster and/or less subject to malfunction and/or not sensitive to surface reflections and/or substantially independent of the type of object involved than was possible with prior art methods.

According to the present invention, this is accomplished in that holography and the interference of coherent light are utilized to determine objects, that is, to identify them, determine their position, determine their deformation or parameters which are a function thereof, such as, for example, pressure, temperature, and to determine their vibrations.

For determining the static characteristics of the objects (type, position, temperature, etc.), the measuring arrangement is composed of a light source, a passive optical medium, preferably a reflection hologram applied to the object and a photosensitive receiver (e.g. a commercial TV camera), coupled to evaluation means (e.g. a monitor with scales). The light source irradiates the hologram on the object. The reflected and/or diffracted light is transformed by the photosensitive receiver into electrical signals, that can be evaluated by conventional evaluation means (e.g. with a monitor).

For determining the vibrations, the measuring arrangement is composed of a source of coherent light, an acousto-optical transducer fixed to the object, a transmission hologram, and a receiver (e.g. a photo diode) connected to an evaluation means. The coherent light from the source is transmitted through the acousto-optical transducer and through the hologram to the receiver. The hologram has the characteristic pattern for a certain vibration spectrum so that deviations from this behavior can be determined easily and quickly by the intensity of the light received. The process applied here is described in Introduction to Fourier Optics, Goodman, Mc. Graw-Hill, Chap. 7.

The measuring or determining process according to the invention is insensitive to electromagnetic interference, has a broad range of application, and is suitable for automatic computer processing. The holograms are substantially insensitive to scratching and obstruction and can also be made insensitive to oil contamination by means of suitable lacquer coatings, such as shellack, applied by conventional methods.

The holograms are preferably Fourier holograms. Fourier holograms are invariant with respect to translations and thus substantially insensitive to vibrations. Since the reconstructed image of a Fourier hologram is reproduced at infinity, the image can always be reproduced sharply by means of a lens regardless of its distance from the hologram, with a fixed focal distance and a fixed image distance.

For identification, at least 128 characters/cm$^2$ can be accommodated on a hologram. The determination of deformation can be performed with varying sensitivity, depending on the hologram selected. Deformations, i.e. relative deformation up to $10^{-7}$; can be measured by suitable selection of hologram and receiver and with the above-stated advantages of this measuring method.

Position determination can be performed with the aid of position markers and/or light pencils (The 13th Congress of the Int. Comm. for Optics, 1984, Three-Dim. Inspection of Large Objects, G. Bickel et. al.), which are the reconstruction of holograms that may be synthetically generated.

The position markers may be the following:

1. Multiplex holograms which show different images as a function of the direction of the incident light. The images provide information, for example, as to the direction in which the object must be moved or rotated to reach the desired position.

2. Holograms which contain individual characteristics that provide information, for example, about the angular coordinates of a coordinate system fixedly associated with the object.

If the holograms are provided with a rotationally variable angle code, information about rotation about the viewing direction can also be provided since the reconstructed image rotates about the 0 order beam when the hologram is rotated around an axis parallel to the 0 order beam.

A special hologram can be used to bundle a group of beams into a light pencil. With the aid of such a light pencil it is possible, for example, to control the movement of the object towards the receiver.

Since the diffraction angle of the first order is always a known characteristic of a hologram, the distance of the receiver from the object can be calculated from the distance between the center of gravity of light distribution of the 0 order beam and the 1 order beam and the diffraction angle.

In all measuring arrangements, a plurality of holograms may also be disposed at the object, as required, at different locations and in different sizes. Alternatively, images for various measuring requirements may be accommodated in one hologram.

The holograms may either be applied to a support which is fixed to the object or they may be stamped directly onto the object by the selection of suitable techniques, e.g. the stamping procedure for producing holograms on postcards.

DESCRIPTION OF THE PREFERRED EMBODIMENTS

Figure 1:
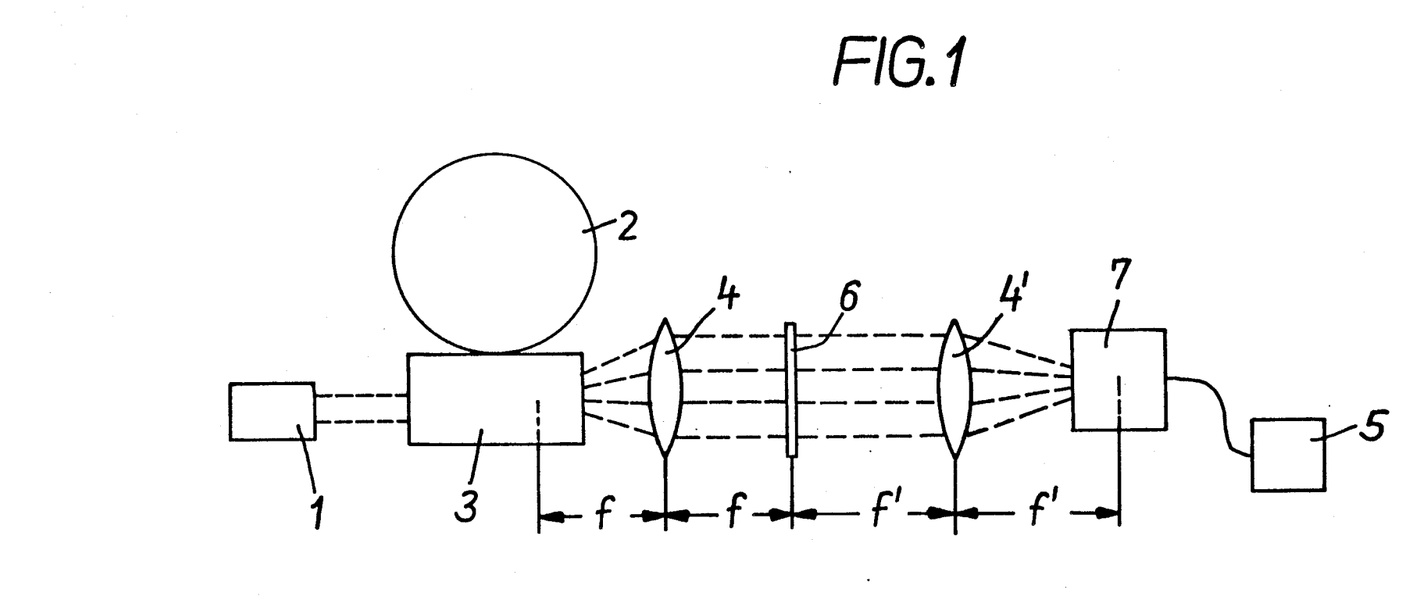
FIG. 1 shows an embodiment of the process according to the invention for measuring vibrations.

FIG. 1 schematically illustrates an embodiment of the invention, employed to determine the dynamic behavior of a motor 2 by monitoring the vibration of the motor 2. In FIG. 1, the coherent light of a laser diode 1 is directed through an acousto-optical transducer 3, e.g. Matsushita Acousto-Optic Devices, which is fixed to the housing of the motor 2, and irradiates a transmission hologram 6. A photo diode 7, disposed behind hologram 6, provides signals for evaluation unit 5. The two lenses 4 and 4' are configured as shown so that the distances from the hologram, the acousto-optical transducer and the photo diode are determined by the focal lengths f and f'.

The hologram has been produced before at its place by conventional methods with the motor in action producing the selected vibration spectrum to be monitored.

With this hologram and the selected vibration spectrum there is the maximum light intensity at the photo diode. The more the vibration spectrum deviates from the selected spectrum, the more the light intensity falls off.

Figure 2:
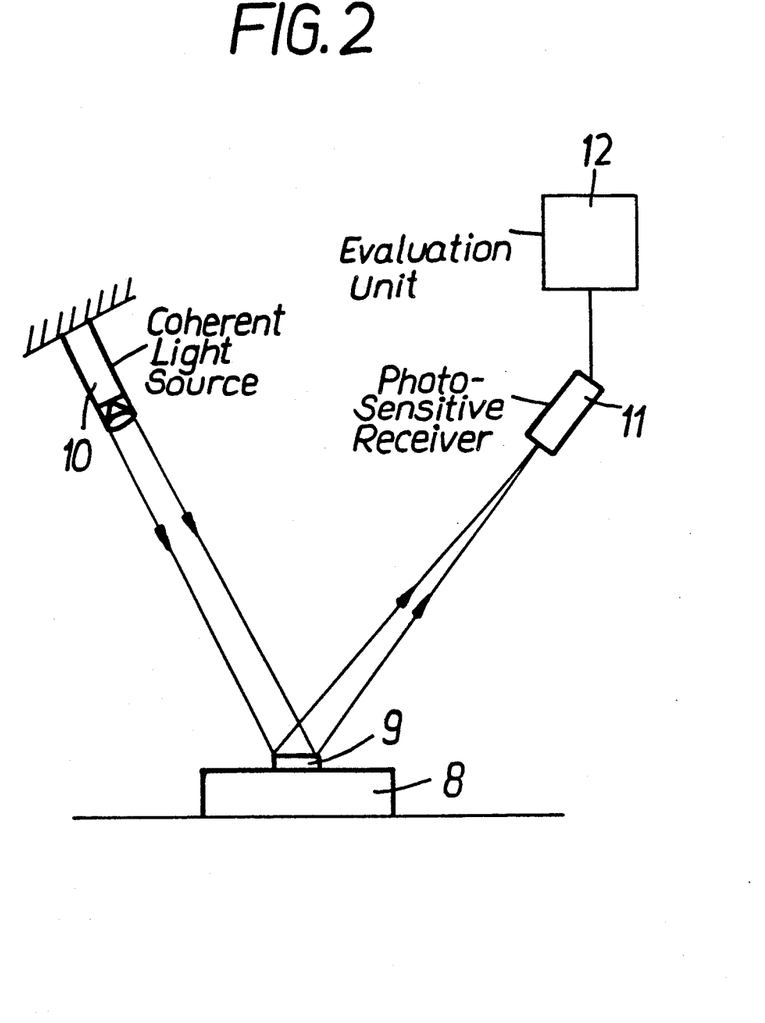
FIG. 2 shows an embodiment of the process according to the invention including a fixed light source for determining and/or measuring the static characteristics.
Figure 3:
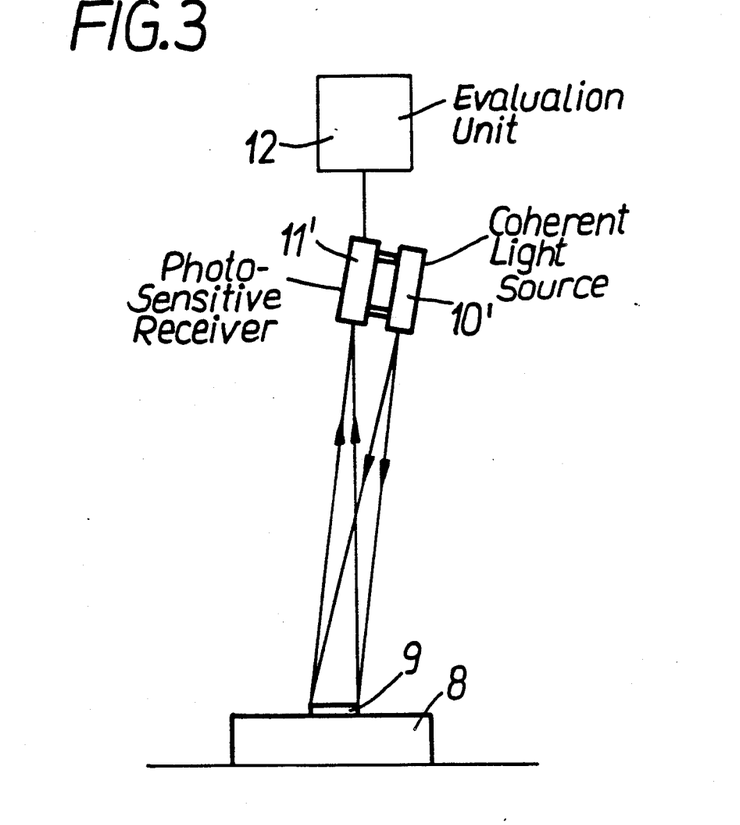
FIG. 3 shows an embodiment of the process according to the invention in which the light source and the receiver are connected with one another for the determination and/or measurement of the static characteristics.

In FIGS. 2 and 3, a coherent light source 10 or 10' irradiates a hologram 9 which is attached on an object 8. The reflected and/or diffracted light is received by a photosensitive receiver 11 or 11' which is connected to an evaluation unit 12. Either the light source 10 and the photosensitive receiver 11 are movable (FIG. 2), or the receiver 11' and the light source 10' are connected with one another (FIG. 3) and moved together. Receiver 11 or 11' respectively provides signals for evaluation unit 12.

Figure 8:
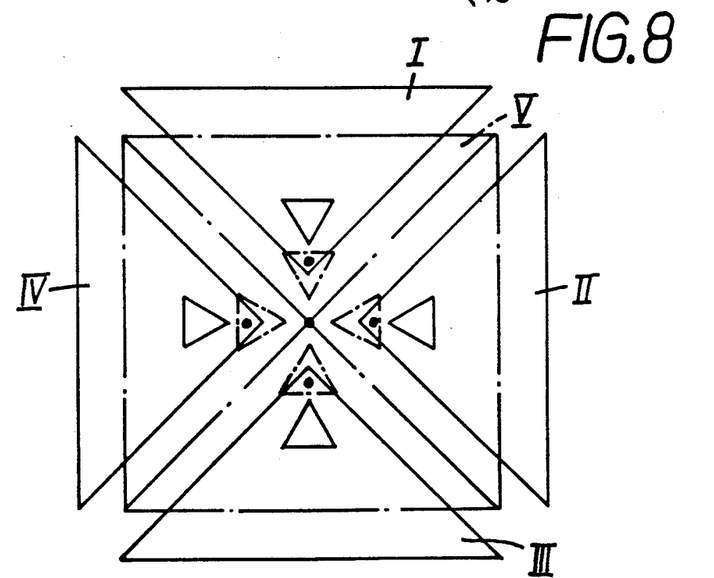
FIG. 8 shows an example of position marker pictures of one position marker hologram.

If hologram 9 is a multiplex hologram configured as a positioning marker for positioning tasks, different images are seen from different directions. An example is shown in FIG. 8. If viewed from directions rotated each time by 90°— direction I, direction II, direction III, direction IV —, the hologram furnishes the image of a triangle likewise rotated by 90°. Each triangle has an orientation point in front of one of its corners. This point indicates in each case the direction of the target location for the receiver 11 or 11'. Only if the photosensitive receiver 11 or 11' is disposed precisely above the hologram 9, the hologram 9 displays four triangles rotated by 90° with respect to one another and a point common to all in the center (V). The hologram 9 as a positioning marker may also be configured in such a manner that the number of images is larger or smaller.

Figure 5:
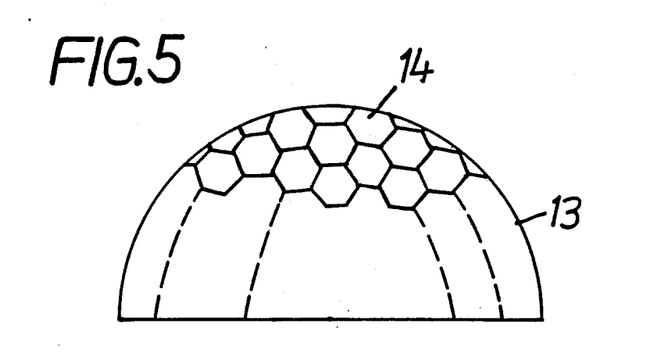
FIG. 5 shows a hemisphere covered with holograms.

FIG. 5 shows a hemisphere 13 that is covered with flat holograms 14 that are tangentially attached to it. The holograms have the shape of a single honeycomb and the assembly of holograms is fitted together like a honeycomb.

Figure 6:
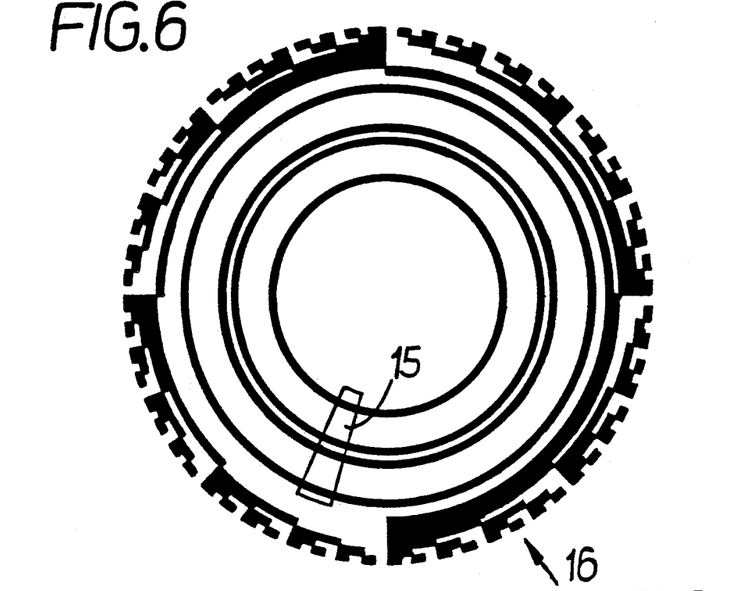
FIG. 6 shows an example of a coding disc.

FIG. 6 shows a coding disc. It is a combination of two codes, the ring code 15 and the angular coding disc 16. The ring code 15 is a rotationally invariant code, while each code of angular coding disc determines a segment of the circle. The value of the ring code is given by the thickness and distances of the rings. There may be stored several values in one ring code. The ring code is for example equivalent to the well known bar code.

Figure 7:
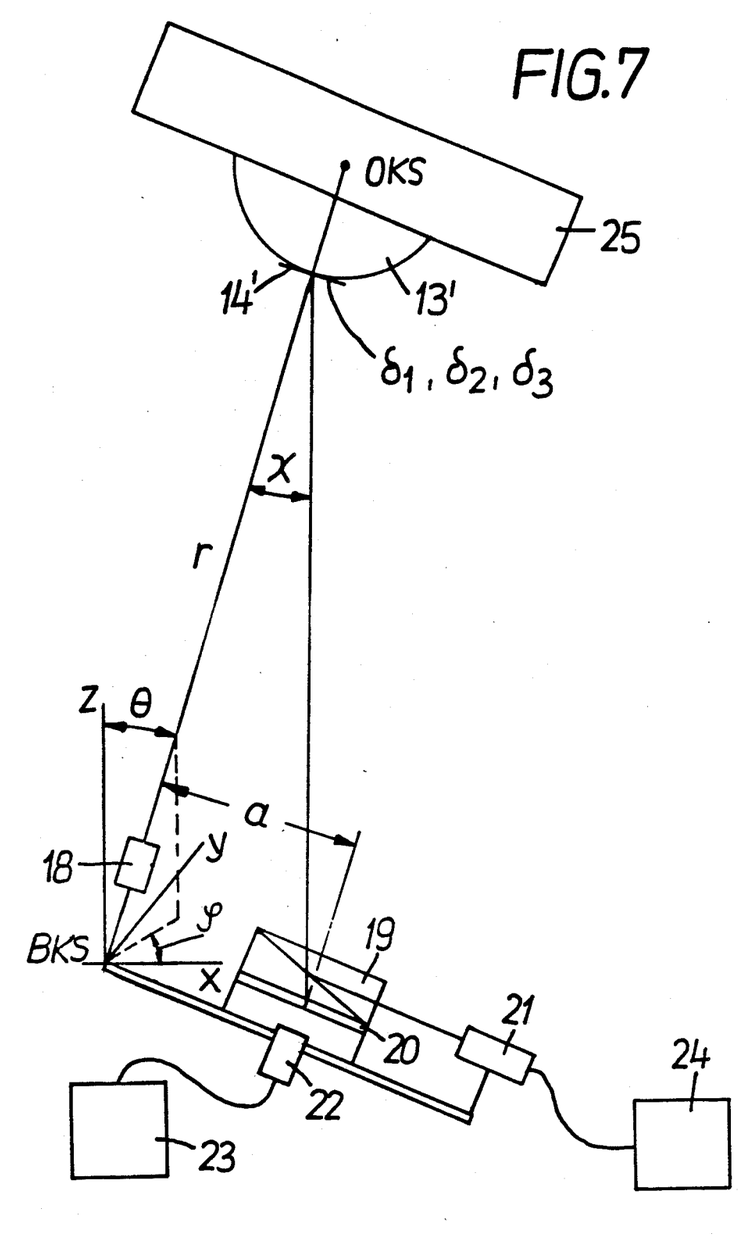
FIG. 7 shows an embodiment of the process according to the invention for a determination of the position of an object with respect to a fixed coordinate system independent of the object.

The process according to FIG. 7 is preferably suitable for determining the position of the object 25 with respect to a fixed coordinate system (BKS) at the measuring point. The measuring arrangement is composed of a laser scanner device 18 (e.g. G-120 D of General Scanning) disposed at the measuring point, attached to it a beamsplitter 19 with a focusing screen 20 and the TV cameras 21 and 22 with the monitors 23 and 24 and an object 25, for example a geometric body — with e.g. a hemisphere — as shown in FIG. 5 attached to it, or a multiplex hologram, but in general it may be any object with holograms on it.

With respect to a fixed coordinate system (BKS), the position of the object 25 can be described by the coordinates (x, y, z, $\alpha$, $\beta$, $\gamma$). x, y, z describe a 3-dim. translation from the origin of the BKS-System; $\alpha$, $\beta$, $\gamma$ describe the rotation about the origin of the BKS-System.

The orientation of the hemisphere 13' is defined by the azimuth $\delta_1$ and the polar angle $\delta_2$ and the rotational angle $\delta_3$. Each hologram 14' of the hemisphere includes the angles $\delta_1$ and $\delta_2$ of that hologram in form of a rotationally invariant code and an angle coding disc to determine $\delta_3$. If the light of the laser scanner hits the hemisphere, the beam is reflected by the hologram 14' on the hemisphere 13'. Only if the 0 order beam is parallel to the original light as shown in the figure is the first order diffraction beam received by the TV cameras 21 and 22 after passing the beamsplitter 19. The images seen by the cameras are shown on monitors 23 and 24. The monitor 24 shows a segment of the ringcode and a segment of the angular code disc. $\delta_1$ and $\delta_2$ can be determined by measuring the thicknesses and distances of the ring segments and $\delta_3$ is determined by a fixed marker on the monitor that selects a special position of the angular code disc, representing a definite angle $\delta_3$. The monitor 23 shows a light intensity distribution, where the point of gravity of the intensity, which in the simplest case can be evaluated by hand, is a measure for the distance "a" between the 0 order beam and the first order beam. As the diffraction angle $\chi$ referring to the point of gravity of the intensity distribution is known as a characteristic constant, the distance "r" can be calculated. With reference to the BKS-System the direction of the light beam of the laser scanner is defined by the angles $\ominus$ and $\zeta$, that can be measured with reference to angular scales that are fixed with the BKS-System. r, $\ominus$, $\zeta$ can be transformed by conventional methods into x, y, z. With x, y, z, $\delta_1$, $\delta_2$, $\delta_3$ the angles $\alpha$, $\beta$, $\gamma$ can be calculated by conventional mathematical methods.

The resolution of the space coordinates as well as the error tolerance depend essentially on the following parameters:

(a) angular resolution of the deflection of the scanner 18 in the x direction;

(b) angular resolution of the deflection of the scanner 18 in the y direction;

(c) size of the holograms, scanning the laser beam over the hologram does not cause a change in the distance "a";

(d) diffraction angles of the holograms;

(e) pixel resolution of the photosensitive receiver 22; and (f) rounding error during the calculation of the transformation.

The resolution of the rotation angles and the error tolerances essentially depend on the following parameters, some of which are not independent of one another:

(a) number of holograms on the surface of the body;

(b) size of the holograms;

(c) curvature of the body surface; Variation of the curvature by way of the body surface can make the resolution a function of the angle. With a flattened-sphere surface, the magnitude of the curvature increases in the edge region and thus angular resolution decreases while in the central region the magnitude of curvature decreases and thus the angular resolution increases. With a spherical surface, the curvature is constant and thus also the angular resolution.

(d) resolution of the space coordinates (error propagation);

(e) degree of discreteness of the angle information in the holograms; and (f) rounding errors in the calculation of the transformation.

If interpolation methods are employed, the resolution of the rotation angles may increase with decreasing distance.

A particularly preferred embodiment of the present invention for measuring deformation employs a laser as a source of coherent light to irradiate a one-dimensional, two-dimensional or three-dimensional Fourier holographically produced grid which is fixed to the object, and the light diffracted at this grid is imaged by a photosensitive receiver (e.g. a commercial TV camera). If there is deformation due to tension, the grating constant becomes larger and therefore the first and higher order diffraction points travel in the direction toward the 0 order diffraction point. For deformation due to pressure, the points travel in the opposite direction. In a three-dimensional grid, the grating constants of the diffraction pattern change correspondingly. As is well known the higher the order of the diffraction points still considered for evaluation, the higher is the measuring accuracy. The changes of the grating constant and therefore the deformation of the object can be calculated by well known methods if the distances and their changes of the first or higher order beam from the 0 order beam are known. For better orientation in a complex diffraction pattern, the first order of the diffraction pattern may be provided with a marker that emerges as a reconstruction of a hologram. If the object is covered by a larger number of holographic grids, inhomogeneous deformations can also be noted in various changes in the diffraction pattern of the grids at the TV camera.

Another, particularly preferred embodiment of the invention for measuring deformation includes a laser as a source of coherent light which irradiates a hologram fixed to the object, with the diffraction pattern of this hologram being a circle or a square and being received by, for example, a commercial TV camera. If there are deformations due to tension or pressure, these figures are deformed to an ellipse or a rectangle, respectively. If demands for sensitivity are low, such simple figures can be used to perform a quick and easy evaluation at the monitor with respect to deformation.

Figure 4:
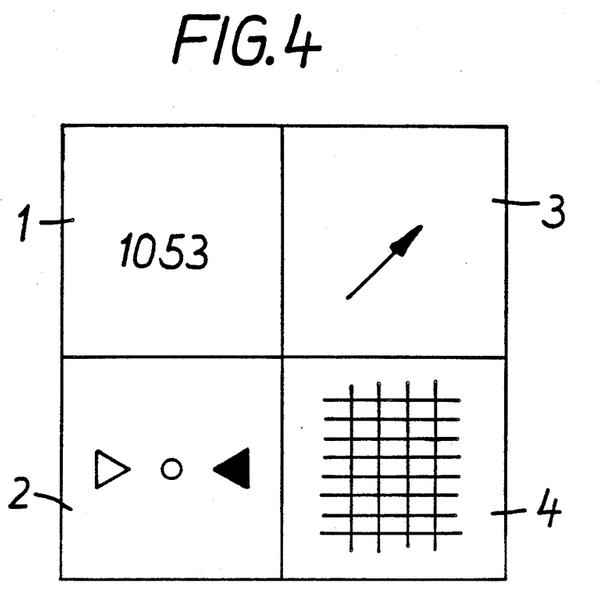
FIG. 4 shows an example of a combined hologram.

In yet another, particularly preferred embodiment of the present invention, the coherent light source 10 in FIG. 2 or 3 irradiates a hologram 9 applied to an object, with such hologram being composed of four partial holograms as shown in FIG. 4. In this example, 4/4 of a square hologram are 25 partial holograms for four different tasks:

1. a hologram which includes a number or a coded number (e.g. bar code) as an object identification number 2. a hologram including a position marker;

3. a hologram which focuses the bundled beams into one beam (light pencil);

4. a two-dimensional holographically produced grid.

The evaluation of the reconstruction of the quadruple hologram consists of the combination of the evaluations of the single holograms described above. The light is conducted in such a manner that only one partial hologram at a time is irradiated (e.g. by scanning a laser beam of an appropriate diameter) and evaluated by the receiver. This permits the object to be identified and/or positioned and its deformation at the location of the surface provided with the hologram to be determined.

The present disclosure relates to the subject matter disclosed in Federal Republic of Germany applications P 36 39 587.0 and P 37 04 313.7, filed Nov. 20th, 1986, and Feb. 12th, 1987, respectively. The entire disclosures of these German applications are incorporated herein by reference.

It will be understood that the above description of the present invention is susceptible to various modifications, changes and adaption, and the same are intended to be comprehended within the meaning and range of equivalents of the appended claims.

What we claim is:

1. A contactless optical process for determining a characteristic of an object, comprising the steps of:

fixing at least one optical medium to the object;

changing the light of a coherent light source with the at least one optical medium;

receiving the changed light with a photosensitive receiver, the photosensitive receiver being connected to an image evaluation unit; and determining the characteristic with the evaluation unit, wherein the at least one optical medium comprises an acousto-optical transducer, and wherein the step of changing the light comprises modulating the light with the acousto-optical transducer.

2. The process of claim 1, further comprising the step of filtering the changed light through a passive optical medium before conducting the step of receiving the changed light with a photosensitive receiver.

3. The process of claim 1, further comprising the step of filtering the changed light through a transmission hologram before conducting the step of receiving the changed light with a photosensitive receiver.

4. The process of claim 1, further comprising the step of filtering the changed light through a Fourier transmission hologram before conducting the step of receiving the changed light with a photosensitive receiver.

5. The process of claim 1, wherein the step of determining the characteristic is conducted by determining the vibration spectrum of the object.

6. An apparatus for determining a characteristic of an object, comprising:
- a reflection hologram which reflects and diffracts light, the hologram being fixed to the object;
- a coherent light source to illuminate the hologram;
- a photosensitive receiver to receive light reflected and diffracted by the hologram; and
- image evaluation unit means, connected to the photosensitive receiver, for determining the characteristic of the object,
- wherein the hologram comprises a multiplex hologram.

7. An apparatus for determining a characteristic of an object, comprising:
- a reflection hologram which reflects and diffracts light, the hologram being fixed to the object;
- a coherent light source to illuminate the hologram;
- a photosensitive receiver to receive light reflected and diffracted by the hologram; and
- image evaluation unit means, connected to the photosensitive receiver, for determining the characteristic of the object,
- wherein the hologram has a structure which is determined by calculation, and wherein the hologram is produced synthetically.

8. An apparatus for determining a characteristic of an object, comprising:
- a reflection hologram which reflects and diffracts light, the hologram being fixed to the object;
- a coherent light source to illuminate the hologram;
- a photosensitive receiver to receive light reflected and diffracted by the hologram; and
- image evaluation unit means, connected to the photosensitive receiver, for determining the characteristic of the object,
- wherein the hologram is stamped directly into the object.

9. An apparatus for determining a characteristic of an object, comprising:
- a reflection hologram which reflects and diffracts light, the hologram being fixed to the object;
- a coherent light source to illuminate the hologram;
- a photosensitive receiver to receive light reflected and diffracted by the hologram; and
- image evaluation unit means, connected to the photosensitive receiver, for determining the characteristic of the object,
- wherein the hologram includes a code for identifying the object.

10. An apparatus for determining a characteristic of an object, comprising:
- a reflection hologram which reflects and diffracts light, the hologram being fixed to the object;
- a coherent light source to illuminate the hologram;
- a photosensitive receiver to receive light reflected and diffracted by the hologram; and
- image evaluation unit means, connected to the photosensitive receiver, for determining the characteristic of the object,
- wherein the hologram has a one-dimensional, holographically produced grid.

11. An apparatus for determining a characteristic of an object, comprising:
- a reflection hologram which reflects and diffracts light, the hologram being fixed to the object;
- a coherent light source to illuminate the hologram;
- a photosensitive receiver to receive light reflected and diffracted by the hologram; and
- image evaluation unit means, connected to the photosensitive receiver, for determining the characteristic of the object,
- wherein the hologram includes position markers which identify the orientation with respect to a target point.

12. An apparatus for determining a characteristic of an object, comprising:
- a reflection hologram which reflects and diffracts light, the hologram being fixed to the object;
- a coherent light source to illuminate the hologram;
- a photosensitive receiver to receive light reflected and diffracted by the hologram; and
- image evaluation unit means, connected to the photosensitive receiver, for determining the characteristic of the object,
- wherein the hologram comprises means for diffracting light from the coherent light source into a light pencil.

13. An apparatus for determining a characteristic of an object, comprising:
- a reflection hologram which reflects and diffracts light, the hologram being fixed to the object;
- a coherent light source to illuminate the hologram;
- a photosensitive receiver to receive light reflected and diffracted by the hologram; and
- image evaluation unit means, connected to the photosensitive receiver, for determining the characteristic of the object,
- wherein the hologram includes the angle coordinates of an imaginary coordinate system fixed to the object in the form of a rotation invariant code.

14. A contactless optical process for determining a characteristic of an object, comprising the steps of:
- fixing at least one optical medium to the object;
- changing the light of a coherent light source with the at least one optical medium;
- receiving the changed light with a photosensitive receiver, the photosensitive receiver being connected to an image evaluation unit; and
- determining the characteristic with the evaluation unit,
- wherein the at least one optical medium comprises a Fourier hologram which reflects and diffracts light, the hologram including the image of an angle coding disc, and wherein the step of changing the light comprises illuminating the hologram with the coherent light source.

15. A contactless optical process for determining a characteristic of an object, comprising the steps of:
- fixing at least one optical medium to the object;
- changing the light of a coherent light source with the at least one optical medium;
- receiving the changed light with a photosensitive receiver, the photosensitive receiver being connected to an image evaluation unit; and
- determining the characteristic with the evaluation unit,
- wherein the at least one optical medium comprises a hologram which reflects and diffracts light, the hologram including a partial hologram which includes a code for identifying the object and at least one further partial hologram for determining a different characteristic of the object, and wherein the step of changing the light comprises illuminating the hologram with the coherent light source.

16. A contactless optical process for determining a characteristic of an object, comprising the steps of:
   fixing at least one optical medium to the object;
   changing the light of a coherent light source with the at least one optical medium;
   receiving the changed light with a photosensitive receiver, the photosensitive receiver being connected to an image evaluation unit; and
   determining the characteristic with the evaluation unit,
   wherein the at least one optical medium comprises a plurality of holograms which reflect and diffract light, a single hologram being flat and having the shape of a honeycomb, the assembly of holograms being fitted together like a honeycomb, and wherein the step of changing the light comprises illuminating the holograms with the coherent light source.

17. An apparatus for determining a characteristic of an object, comprising:
   a reflection hologram which reflects and diffracts light, the hologram being fixed to the object;
   at least one additional hologram which reflects and diffracts light, the at least one additional hologram being fixed to the object, the holograms substantially covering the surface of the object;
   a coherent light source to illuminate the holograms;
   a photosensitive receiver to receive light reflected and diffracted by the holograms; and
   image evaluation unit means, connected to the photosensitive receiver, for determining the characteristic of the object.

18. A contactless optical process for determining a characteristic of an object, comprising the steps of:
   fixing at least one optical medium to the object;
   changing the light of a coherent light source with the at least one optical medium;
   receiving the changed light with a photosensitive receiver, the photosensitive receiver being connected to an image evaluation unit; and
   determining the characteristic with the evaluation unit,
   wherein the object has a curved surface, wherein the at least one optical medium comprises a hologram which reflects and diffracts light, the hologram including angle coordinates of an imaginary coordinate system fixed to the object in the form of a rotation invariant code, and wherein the step of changing the light comprises illuminating the hologram with the coherent light source.

19. A contactless optical process for determining a characteristic of an object, comprising the steps of:
   fixing at least one optical medium to the object;
   changing the light of a coherent light source with the at least one optical medium;
   receiving the changed light with a photosensitive receiver, the photosensitive receiver being connected to an image evaluation unit; and
   determining the characteristic with the evaluation unit,
   wherein the object has a spherical surface, wherein the at least one optical medium comprises a hologram which reflects and diffracts light, the hologram including angle coordinates of an imaginary coordinate system fixed to the object in the form of a rotation invariant code, and wherein the step of changing the light comprises illuminating the hologram with the coherent light source.

20. An apparatus for determining a characteristic of an object, comprising:
   a reflection hologram which reflects and diffracts light, the hologram being fixed to the object;
   a coherent light source to illuminate the hologram;
   a photosensitive receiver to receive light reflected and diffracted by the hologram; and
   image evaluation unit means, connected to the photosensitive receiver, for determining the characteristic of the object,
   wherein the hologram has a two-dimensional, holographically produced grid.

21. An apparatus for determining a characteristic of an object, comprising:
   a reflection hologram which reflects and diffracts light, the hologram being fixed to the object;
   a coherent light source to illuminate the hologram;
   a photosensitive receiver to receive light reflected and diffracted by the hologram; and
   image evaluation unit means, connected to the photosensitive receiver, for determining the characteristic of the object,
   wherein the hologram has a three-dimensional, holographically produced grid.

22. An apparatus for determining a characteristic of an object comprising:
   an acousto-optical transducer fixed to the object;
   a coherent light source to illuminate the transducer, the transducer modulating light from the light source;
   a photosensitive receiver to receive light modulated by the transducer; and
   image evaluation unit means, connected to the photosensitive receiver, for determining the characteristic of the object.

23. The apparatus of claim 22, wherein the coherent light source comprises one of a laser and a laser diode.

24. The apparatus of claim 22, wherein the photosensitive receiver comprises a TV camera.

25. The apparatus of claim 22, wherein the photosensitive receiver comprises a laser scanning device, and wherein the coherent light source comprises one of a laser and a laser diode, said one of a laser and a laser diode being combined with the laser scanner device.

26. The apparatus of claim 25, wherein the angle coordinates of the laser scanner device are defined with respect to a fixed coordinate system.

27. A contactless optical process for determining characteristics of an object, comprising the steps of:
   fixing a hologram which reflects and diffracts light to the object;
   illuminating the hologram with light from a coherent light source;
   receiving light reflected from the hologram with a photosensitive receiver, the photosensitive receiver being connected to an image evaluation unit; and
   determining the characteristics with the evaluation unit,
   wherein the hologram includes at least a first partial hologram for determining a first characteristic of the object and a second partial hologram for determining a second characteristic of the object, the first and second characteristics of the object being different from one another.

28. A contactless optical process according to claim 27, wherein the first characteristic is one of the identity, position, and deformation of the object, wherein the second characteristic is another of the identity, position, and deformation of the object, and wherein the step of determining the characteristics is conducted by determining at least two of the identity, position, and deformation of the object.

* * * * *